United States Patent
Utermoehlen et al.

(10) Patent No.: US 10,928,222 B2
(45) Date of Patent: Feb. 23, 2021

(54) ROTATION ANGLE SENSOR HAVING A COMPENSATION ELEMENT

(71) Applicant: Robert Bosch GmbH, Stuttgart (DE)

(72) Inventors: Fabian Utermoehlen, Lippstadt (DE); Andreas Merz, Freiberg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 16/330,799

(22) PCT Filed: Aug. 16, 2017

(86) PCT No.: PCT/EP2017/070723
§ 371 (c)(1),
(2) Date: May 24, 2019

(87) PCT Pub. No.: WO2018/046258
PCT Pub. Date: Mar. 15, 2018

(65) Prior Publication Data
US 2019/0285437 A1    Sep. 19, 2019

(30) Foreign Application Priority Data
Sep. 9, 2016    (DE) .................. 10 2016 217 254

(51) Int. Cl.
*G01D 5/20* (2006.01)
*G01D 5/244* (2006.01)

(52) U.S. Cl.
CPC ....... *G01D 5/2046* (2013.01); *G01D 5/24485* (2013.01); *G01D 5/2053* (2013.01); *G01D 5/2073* (2013.01)

(58) Field of Classification Search
CPC .. G01D 5/2046; G01D 5/2053; G01D 5/2073; G01D 5/24485; G01D 5/204
See application file for complete search history.

(56) References Cited

U.S. PATENT DOCUMENTS 7,190,158 B2    3/2007    Tiemann
7,538,544 B2 *  5/2009    Lee ................ G01D 5/2053
                                            324/207.17
(Continued)

FOREIGN PATENT DOCUMENTS

DE    36 42 607 A1    6/1988
DE    103 20 990 A1   11/2004
(Continued)

OTHER PUBLICATIONS

International Search Report corresponding to PCT Application No. PCT/EP2017/070723, dated Nov. 20, 2017 (German and English language document) (5 pages).

*Primary Examiner* — Jay Patidar
(74) *Attorney, Agent, or Firm* — Maginot, Moore & Beck LLP

(57) ABSTRACT

A rotation angle sensor includes a stator element and a rotor element, which is mounted in a rotatable manner about an axis of rotation with respect to the stator element. A rotation angle is captured via inductive coupling between the rotor element and the stator element. A compensation element is arranged on the stator element. The compensation element has a compensation transmitting coil configured to emit an alternating electromagnetic compensation field and at least one compensation receiving coil configured to receive alternating electromagnetic fields. The rotor element has a first electrically conductive section. The first electrically conductive section is arranged on the rotor element and is inductively coupled to the compensation transmitting coil and to the at least one compensation receiving coil of the compensation element.

10 Claims, 6 Drawing Sheets

(56) References Cited

U.S. PATENT DOCUMENTS

2018/0224301 A1* 8/2018 Herrmann .............. G01D 5/204
2019/0186891 A1* 6/2019 Utermoehlen ....... G01D 5/2053

FOREIGN PATENT DOCUMENTS

| DE | 10 2007 037 217 A1 | 2/2009 |
| DE | 10 2009 027 191 A1 | 12/2010 |
| DE | 10 2013 226 203 A1 | 6/2015 |
| DE | 10 2014 220 454 A1 | 4/2016 |
| EP | 0 909 955 A2 | 4/1999 |
| FR | 2 919 925 A1 | 2/2009 |

\* cited by examiner

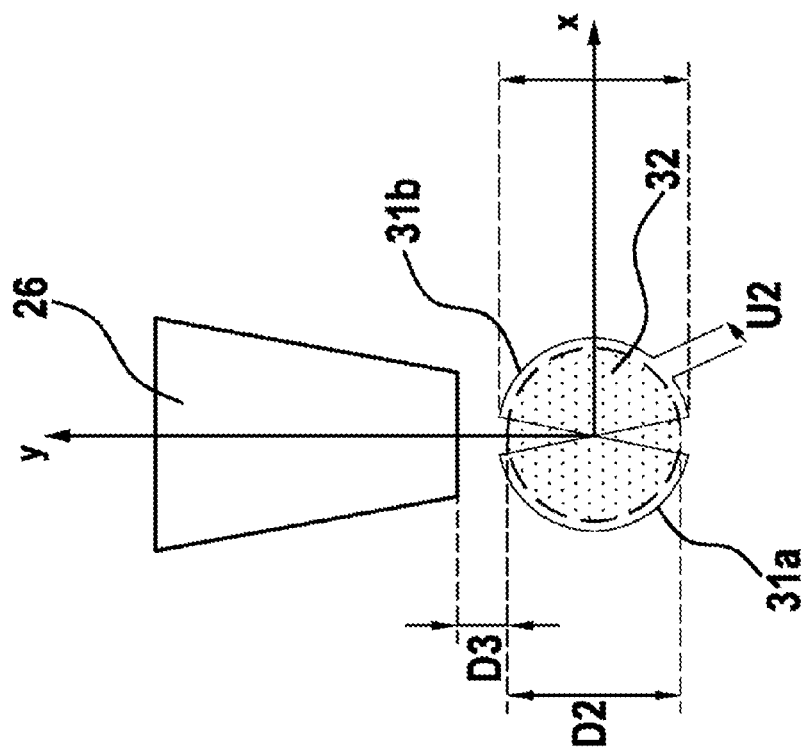
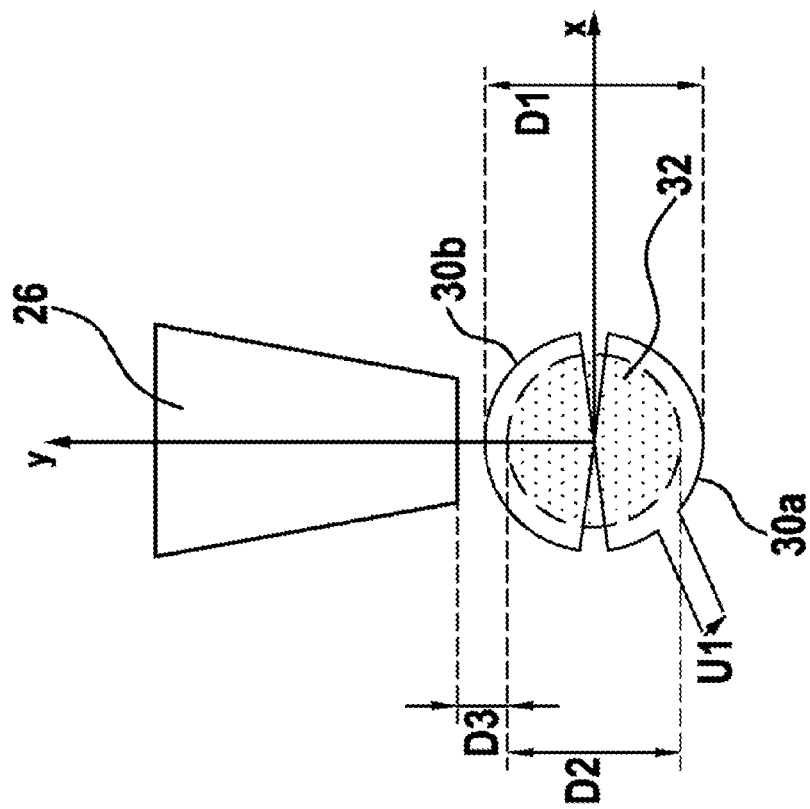
Fig. 3

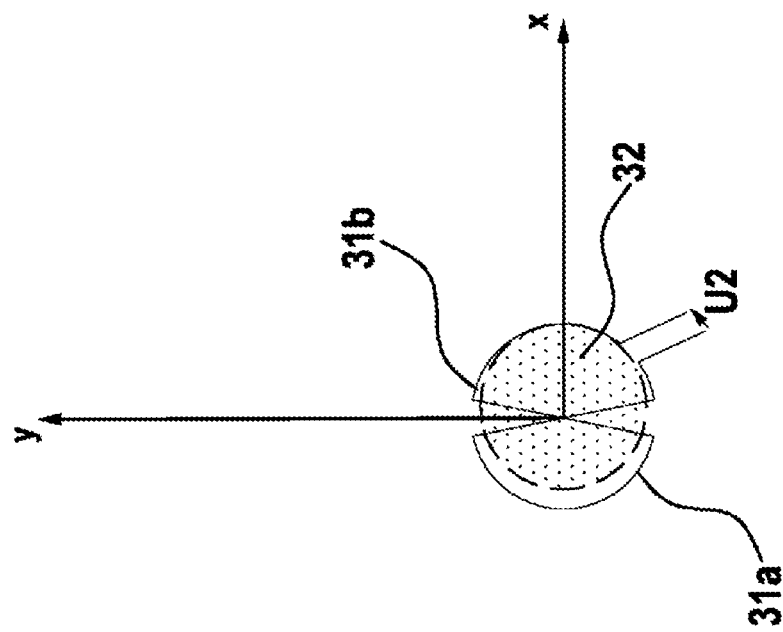
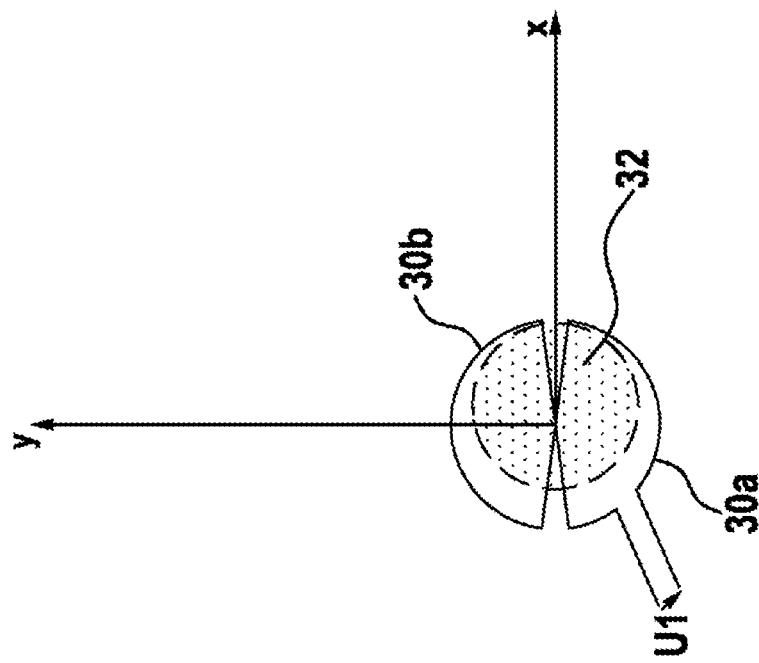
Fig. 4

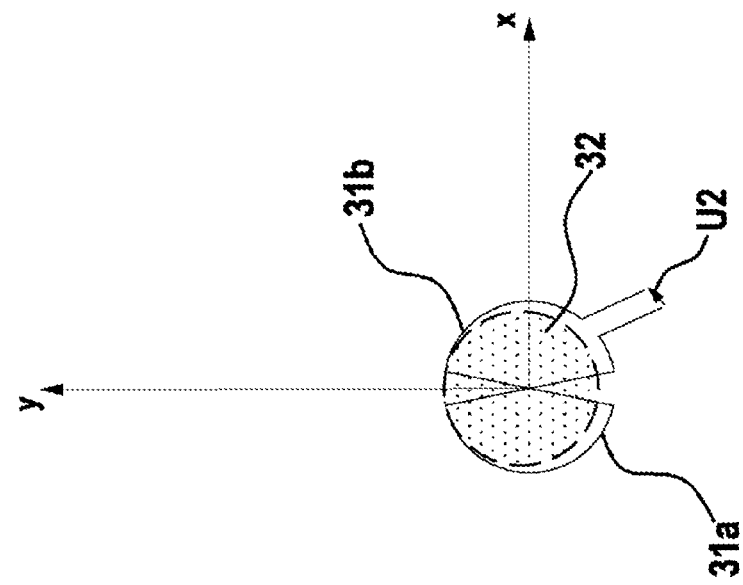
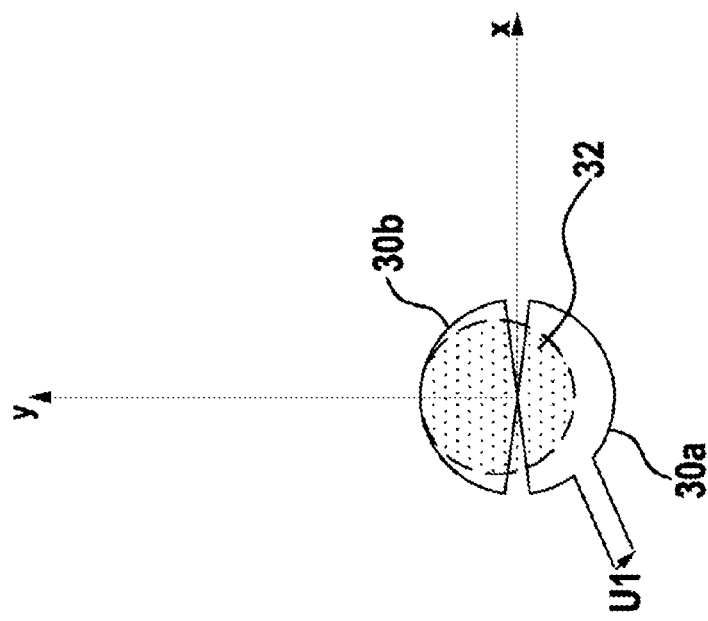
Fig. 5

ROTATION ANGLE SENSOR HAVING A COMPENSATION ELEMENT

BACKGROUND

This application is a 35 U.S.C. § 371 National Stage Application of PCT/EP2017/070723, filed on Aug. 16, 2017, which claims the benefit of priority to Serial No. DE 10 2016 217 254.9, filed on Sep. 9, 2016 in Germany, the disclosures of which are incorporated herein by reference in their entirety.

The disclosure relates to a rotation angle sensor, a stator element, and a rotor element therefor.

The rotation angle may be detected depending on an induced AC voltage by arranging transmitting and receiving coils on the stator of a rotation angle sensor which are inductively coupled to a target on the rotor in such a way that the emission of an alternating electromagnetic field by the transmitting coil induces the AC voltage in the receiving coil.

This is described, for example, in EP 0 909 955 B1.

SUMMARY

Errors may occur in physical sensors caused by the diametral clearance or tolerances due to manufacturing with respect to the relative position of the stator element and rotor element, said errors being large enough that, e.g., a specification with respect to the accuracy of the measured rotation angle may no longer be satisfied.

Therefore, there may be a need for providing a rotation angle sensor, which may also compensate for changes occurring in the measurement signal for angle detection in the case of radial deviations of the stator element or of the stator relative to the rotor element or to the rotor from an ideal position, e.g., a centered position.

It is therefore the object of the disclosure to provide an improved rotation angle sensor.

This problem is solved by the rotation angle sensor and the stator element and the rotor element as disclosed herein.

Additional advantageous embodiments of the disclosure are indicated in the dependent claims.

A corresponding rotation angle sensor comprises a stator element and a rotor element which is rotatably mounted about an axis of rotation with respect to the stator element, wherein the rotation angle may be able to be detected by an inductive coupling between the rotor element and the stator element. A compensation element is arranged on the stator element, wherein the compensation element comprises a compensation transmitting coil for emitting an alternating electromagnetic compensation field and at least one compensation receiving coil for receiving alternating electromagnetic fields. The rotor element has a first electrically-conductive section, wherein the first electrically-conductive section is arranged on the rotor element in such a way and is inductively coupled to the compensation transmitting coil and to the at least one compensation receiving coil of the compensation element in such a way that, during emission of the alternating electromagnetic compensation field by the compensation transmitting coil, a compensation AC voltage induced in the at least one compensation receiving coil is predominantly dependent on a relative radial arrangement of the stator element and of the rotor element to each other with respect to the axis of rotation. The stator element has at least one angle detection transmitting coil for emitting an alternating electromagnetic angle detection field and at least one angle detection receiving coil for detecting alternating electromagnetic fields. The rotor element has at least one second electrically-conductive section, wherein the at least one second electrically-conductive section is inductively coupled to the at least one angle detection receiving coil in such a way that, during emission of the alternating electromagnetic angle detection field by the at least one angle detection transmitting coil, at least one angle detection AC voltage is induced in the at least one angle detection receiving coil. The at least one second electrically-conductive section is arranged on the rotor element in such a way that the angle detection AC voltage, induced in the at least one angle detection receiving coil, is dependent, in particularly predominantly dependent, on a rotation angle between the stator element and the rotor element, wherein the at least one second electrically-conductive section is arranged on the rotor element outside of the first electrically-conductive section in the radial direction, when viewed with respect to the axis of rotation, in particular is shaped like an arc with respect to the axis of rotation, and wherein the at least one angle detection transmitting coil is arranged on the stator element outside of the compensation element in the radial direction, when viewed with respect to the axis of rotation, in particular within an arc-shaped section of the stator element with respect to the axis of rotation.

An "electrically-conductive" section may also be understood as an "electrically-conducting section" in the meaning of this application. It is understood thereby, that materials generally used or designated as insulators in the meaning of the application are not considered to be "electrically-conductive" or "electrically-conducting". For example, a metal sheet may only be electrically-conductive or electrically-conducting.

The compensation AC voltage is induced in the at least one first compensation receiving coil by the emission of the alternating electromagnetic compensation field. The first electrically-conductive section of the rotor element, also designatable as a so-called target, is thereby used for the inductive coupling. The inductive coupling thereby depends on the relative radial arrangement of the target and compensation element. The target is arranged on the rotor element, the compensation element is arranged on the stator element. Thus, the relative radial arrangement of the rotor element and stator element influences the induced compensation AC voltage depending on the inductive coupling between the compensation element and the target. By monitoring the induced compensation AC voltage, the relative radial arrangement of the rotor element and stator element is thus able to be monitored. Due to the monitoring, an occurrence of tolerances in the arrangement of the rotor element and stator element may be recognized. The amplitude of the voltage induced by the compensation transmitting coil changes depending on the relative overlap of the at least one compensation receiving coil by the first electrically-conductive section of the rotor element or by the target.

A particularly compact structure of the rotation angle sensor is additionally enabled by this arrangement. The compact structure arises from the fact that the at least one second electrically-conductive section is arranged on the rotor element outside of the first electrically-conductive section in the radial direction, when viewed with respect to the axis of rotation, and that the at least one angle detection transmitting coil is arranged on the stator element outside of the compensation element in the radial direction, when viewed with respect to the axis of rotation. In this advantageous configuration, the compensation element is arranged, e.g., centrally, in particular in an area in direct proximity to the axis of rotation which is otherwise unused for detecting the rotation angle.

Advantageously, the compensation element has a first compensation receiving coil and a second compensation receiving coil, which are arranged in such a way with respect to each other and to the axis of rotation that the alternating electromagnetic compensation field induces a first compensation AC voltage in the first compensation receiving coil and a second compensation AC voltage in the second compensation receiving coil, wherein the first compensation AC voltage and the second compensation AC voltage change at a radial displacement of the first electrically-conductive section with respect to a predefined radial arrangement of the first electrically-conductive section with respect to the axis of rotation in comparison to the values of the first compensation AC voltage and the second compensation AC voltage expected when the first conductive section is located in the predefined radial arrangement.

This is a particularly favorable arrangement for a rotation angle sensor. If, for example, an offset of 90° is selected, then a Cartesian coordinate system with an origin at the axis of rotation may be defined so that the compensation AC voltages of the two compensation receiving coils may be interpreted as signals, which specify a deviation from the predefined radial arrangement in the x-direction and y-direction. By this means, radial deviations of the relative arrangement of the rotor element with respect to the stator element may be measured as a linear combination of the deviations along the x-axis and the y-axis. In this case, for example, two compensation receiving coils can be arranged offset by 90° in a neutral position of the rotor element in the rotation angle sensor. A horizontal and a vertical offset are thus directly determined using vector measurement. Thus, at a 90° offset, x- and y-tolerances may be directly measured without requiring a conversion.

A winding of the at least one compensation receiving coil is preferably arranged radially to the axis of rotation at least partially overlapping with the first electrically-conductive section, wherein in particular the radial extension of the first electrically-conductive section is smaller than the radial extension of the at least one compensation receiving coil.

Upon the occurrence of tolerances, the first electrically-conductive section moves radially with respect to the axis of rotation. This movement takes place within a region in which the first electrically-conductive section and the at least one compensation receiving coil overlap at least partially. Due to this movement, inductive couplings of different strengths are generated, which are detectable as different compensation AC voltages. Tolerances may be recognized particularly well with this arrangement.

A winding of the at least one compensation transmitting coil is preferably arranged radially to the axis of rotation at least partially overlapping with the first electrically-conductive section, wherein in particular the radial extension of the first electrically-conductive section is smaller than the radial extension of the at least one compensation transmitting coil.

Upon the occurrence of tolerances, the first electrically-conductive section moves radially with respect to the axis of rotation. This movement takes place within a region in which the first electrically-conductive section and the at least one compensation transmitting coil overlap at least partially. Due to this movement, inductive couplings of different strengths are generated, which are detectable as different compensation AC voltages. Tolerances may be recognized particularly well with this arrangement.

Advantageously, the at least one first electrically-conductive section is an electrically-conductive circle or circular ring surrounding the rotor element in the circumferential direction. Thus, a single first electrically-conductive section covers each angle range for a 360° rotation angle sensor. This form of the first electrically-conductive section is particularly easy to produce in particular as a stamped part.

The at least one first electrically-conductive section advantageously extends radially from the axis of rotation, wherein the at least one second electrically-conductive section connects radially to the first electrically-conductive section, thus extending in the direction, e.g., of the axis of rotation. The first electrically-conductive section is arranged, when viewed in the radial direction, between the axis of rotation and the second electrically-conductive section, wherein, when viewed in the radial direction, a preferably circular arc shaped gap or slot is provided between the second electrically-conductive section and the first electrically-conductive section, said gap or slot preferably extending in the circumferential direction. This arrangement prevents an unintentional inductive coupling of the second electrically-conductive section with the compensation element. An error detection is thus prevented.

Advantageously, a radial extension of the at least one compensation receiving coil is greater than a radial extension of the first conductive section.

Due to the larger extension of the compensation receiving coil, viewed radially to the axis of rotation, said compensation receiving coil overlaps completely with the first electrically-conductive section in the centered arrangement. This improves the inductive coupling between the compensation receiving coil and first electrically-conductive section in the centered position of the rotor element and stator element.

Advantageously, the extension of the gap or of the slot in the radial direction is at least 50% of the difference of a radial extension of the at least one compensation receiving coil and a radial extension of the first conductive section.

During the occurrence of tolerances, sufficient distance also remains between the second conductive section and the compensation receiving coil, when viewed radially to the axis of rotation, in order to prevent an unintentional inductive coupling between the second conductive section and compensation receiving coil. The radial extension of the first conductive section may be, e.g., at most 90% or even at most 80% of the radial extension of the at least one compensation receiving coil.

The at least one compensation receiving coil advantageously comprises an identical number of first sub-coils and second sub-coils, which are arranged with respect to each another and with respect to the axis of rotation in such a way that the alternating electromagnetic compensation field induces a first AC voltage component in the first sub-coil and a second AC voltage component in the second sub-coil with opposite signs, wherein the first AC voltage component and the second AC voltage component compensate in a predefined radial arrangement of the first electrically-conductive section with respect to the axis of rotation. The induced voltage is thus 0 V in the predefined radial arrangement. Thus, the predefined radial arrangement is easily detectable.

The first electrically-conductive section is preferably symmetrical with respect to the axis of rotation, when the first electrically-conductive section is located in a predefined radial arrangement to the axis of rotation.

The symmetrical, in particular point symmetrical arrangement has the effect that, in the centered position of the first electrically-conductive section with respect to the axis of rotation, the voltage induced in the at least one compensation receiving coil is 0 V. Thus, a centered position of the rotor element and stator element is easily detectable.

The disclosure also relates to a stator element and a rotor element of the type described for a rotation angle sensor.

BRIEF DESCRIPTION OF THE DRAWINGS

Preferred embodiments of the disclosure are subsequently explained in greater detail by way of the appended drawings. As shown in:

FIG. 3 two schematic detail views of the rotation angle sensor in a first arrangement of a stator element and a rotor element in the rotation angle sensor, FIG. 4 two schematic detail views of the rotation angle sensor in a second arrangement of the stator element and the rotor element in the rotation angle sensor, FIG. 5 two schematic detail views of the rotation angle sensor in a third arrangement of the stator element and the rotor element in the rotation angle sensor, and FIG. 6 a schematic view shown not to scale of a circular ring shaped electrically conductive section.

DETAILED DESCRIPTION

Figure 1:
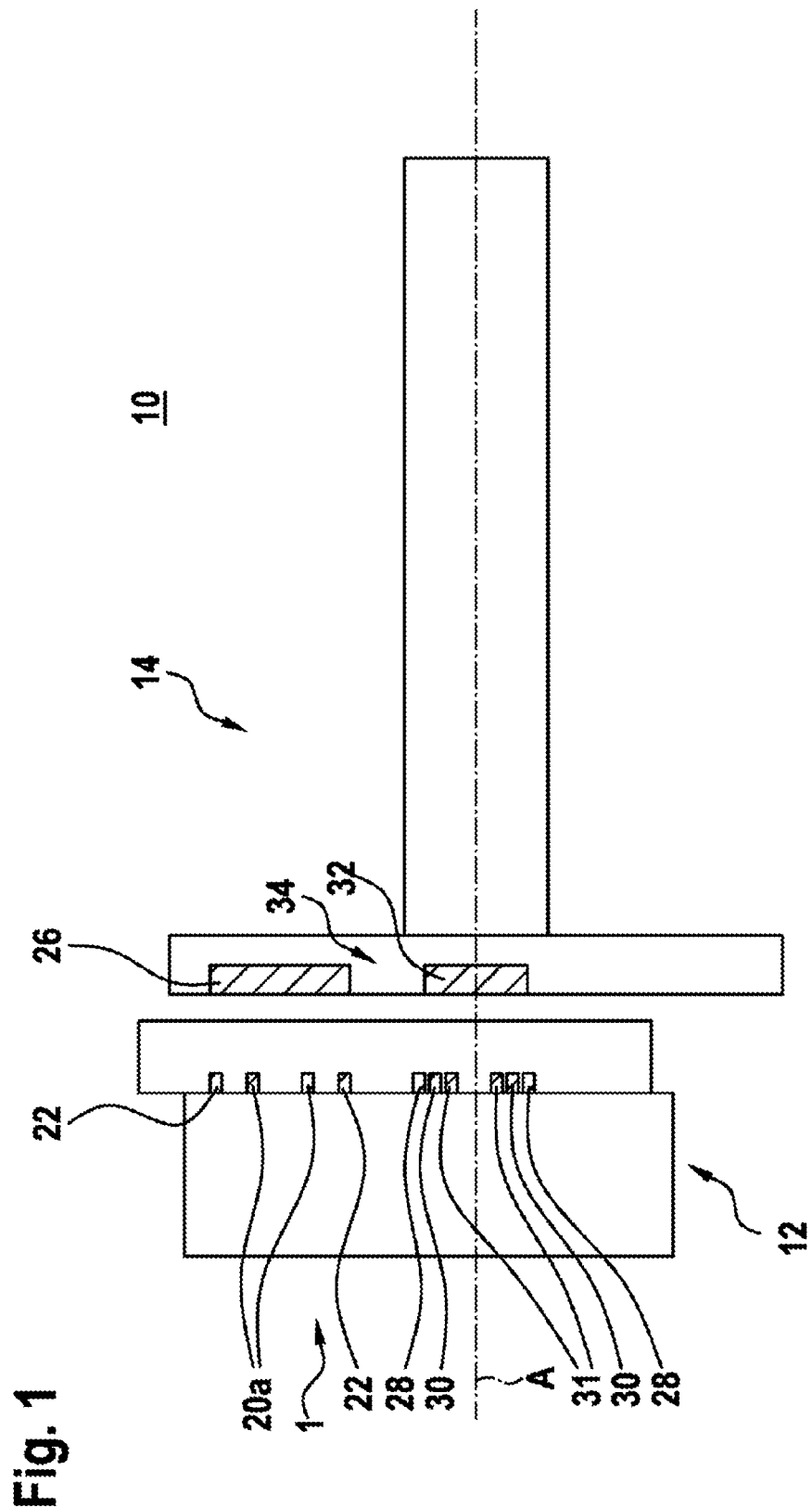
FIG. 1 a schematic view of a part of a rotation angle sensor in a side view.

FIG. 1 schematically shows a side view of a rotation angle sensor 10, comprising a stator element 12 and a rotor element 14, rotatably mounted about an axis of rotation A with respect to the stator element 12.

The rotation angle is detectable by an inductive coupling between rotor element 14 and stator element 12. Details regarding the inductive coupling and its use to determine the rotation angle are described, for example, in EP 0 909 955 B1.

Correspondingly, stator element 12 has at least one angle detection transmitting coil 22 depicted by way of example in FIG. 1 for emitting an alternating electromagnetic angle detection field and at least one angle detection receiving coil 20 for detecting alternating electromagnetic fields. Angle detection receiving coil 20 preferably extends in a plane perpendicular to axis of rotation A in the radial direction inside of angle detection transmitting coil 22. Angle detection receiving coil 20 is preferably arranged in the same plane of a sensor circuit board for rotation angle sensor 10 in which angle detection transmitting coil 22 is arranged.

"Radial" or "radial arrangement" subsequently means a spoke shaped direction or arrangement extending from axis of rotation A. "Circumferential" or "circumferential direction" subsequently means a circular direction substantially in a plane perpendicular to axis of rotation A. "Axial direction" subsequently means a direction along axis of rotation A.

A sensor circuit board for rotation angle sensor 10 comprises for example at least one circumferentially arranged angle detection transmitting coil 22, which has one or more windings and is preferably designed as a planar coil. The windings may be advantageously realized in multiple planes of a multilayer circuit board in order to be able to generate a sufficiently large alternating electromagnetic field. The at least one angle detection transmitting coil 22 is acted upon by an AC voltage, which has amplitudes in the range of 0.5 V to 10 V, preferably 1.5 V, at frequencies in the range of a few MHz, preferably 5 MHz.

A compensation element 1 is arranged on stator element 12. Compensation element 1 comprises a compensation transmitting coil 28 for emitting an alternating electromagnetic compensation field, and at least one compensation receiving coil 30, 31 for receiving alternating electromagnetic fields. The at least one compensation receiving coil 30, 31 extends preferably in a plane perpendicular to axis of rotation A in a radial direction with respect to axis of rotation A inside of compensation transmitting coil 28. The at least one compensation receiving coil 30, 31 is preferably arranged in the same plane of the sensor circuit board for rotation angle sensor 10, in which compensation transmitting coil 28 is arranged.

Rotor element 14 has a first electrically-conductive section 32.

First electrically-conductive section 32 is arranged on rotor element 14 in such a way and inductively coupled to compensation transmitting coil 28 and to at least one compensation receiving coil 30, 31 of compensation element 1 in such a way that, during emission of the alternating electromagnetic compensation field by compensation transmitting coil 28, a compensation AC voltage, induced in the at least one compensation receiving coil 30, 31, depends predominantly on a radial arrangement of stator element 12 and rotor element 14 with respect to the axis of rotation.

Rotor element 14 has at least one second electrically-conductive section 26. The at least one second electrically-conductive section 26 is inductively coupled to the at least one angle detection receiving coil 20 in such a way, that upon emission of the alternating electromagnetic angle detection field by the at least one angle detection transmitting coil 22, at least one angle detection AC voltage is induced in the at least one angle detection receiving coil 20.

The at least one second electrically-conductive section 26 is arranged on rotor element 14 in such at way that the angle detection AC voltage, induced in the at least one angle detection receiving coil 20, depends, in particular predominantly depends, on a rotation angle between stator element 12 and rotor element 14.

The at least one second electrically-conductive section 26 is arranged on rotor element 14 outside of first electrically-conductive section 32 with respect to axis of rotation A, when viewed in the radial direction.

The at least one angle detection transmitting coil 22 is arranged on stator element 12 outside of compensation element 1 with respect to axis of rotation A, when viewed in the radial direction.

Details regarding the arrangement of the at least one angle detection transmitting coil 22, the at least one angle detection receiving coil 20, and the at least one second electrically-conductive section 26, and details regarding the determination of the rotation angle are known, for example, from EP 0 909 955 B1.

Figure 2:
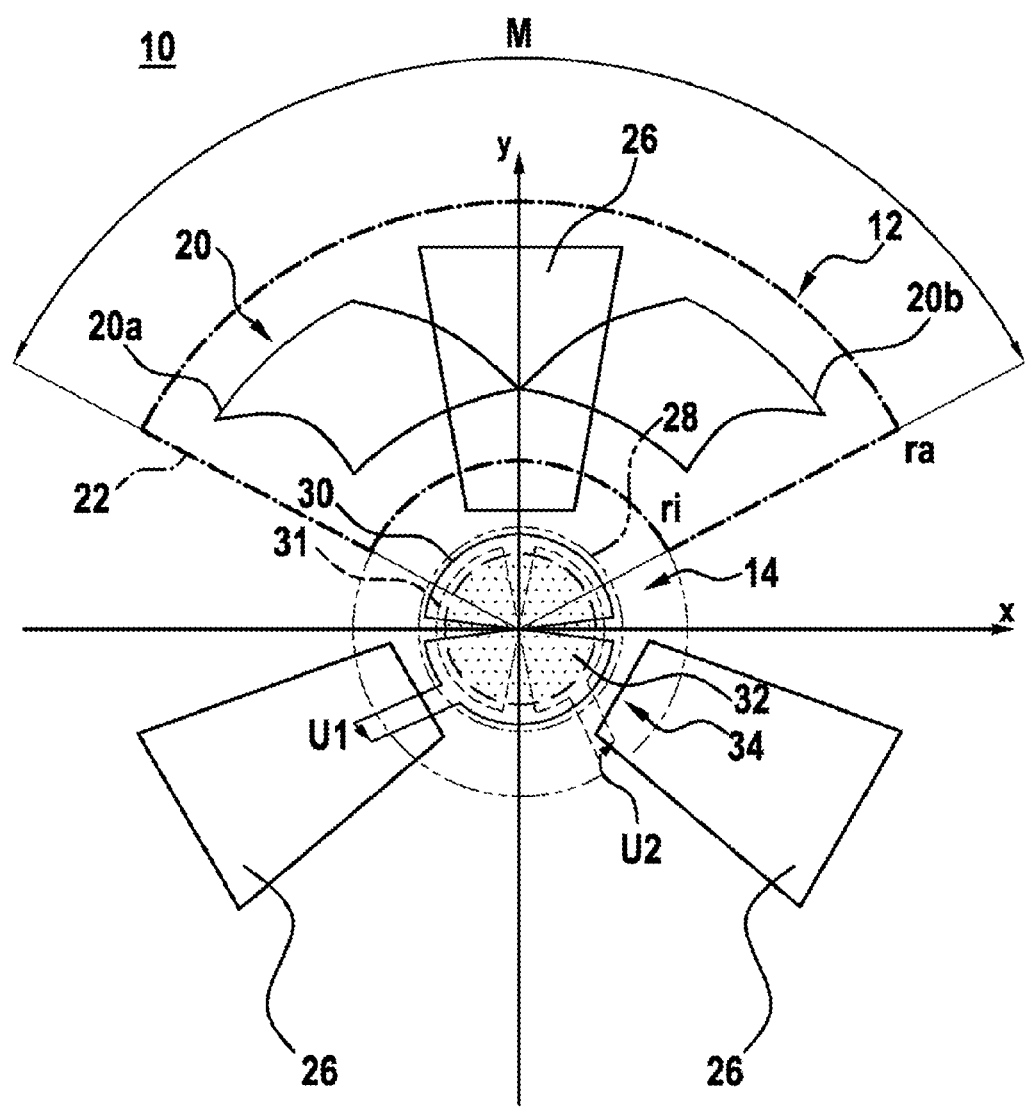
FIG. 2 a schematic view of a part of the rotation angle sensor in a top view.

FIG. 2 shows a top view on rotation angle sensor 10 in a two-dimensional Cartesian coordinate system whose x-axis and y-axis extend perpendicular to axis of rotation A and whose origin lies at axis of rotation A.

The at least one angle detection transmitting coil 22 has at least one conductor path, which surrounds the at least one angle detection receiving coil 20. The at least one angle detection transmitting coil 22 preferably extends within a circular ring or circular arc shaped surface, which is delimited by an inner radius ri and an outer radius ra. For a rotation angle segment sensor which has a measuring range that is smaller than 360°, for example, a center angle M of the circular ring sector is provided, which is 5° to 10° larger than the measuring range of the rotation segment sensor. If, for example, the rotation segment sensor has a measuring range of 120°, the center angle M of the circular ring sector is, for example, M=130°.

Outer radius ra is, for example, delimited by the available installation space and is several 10s of mm and is preferably 25 mm. Inner radius ri is dimensioned large enough that the compensation coils may be placed and provide a sufficiently high signal. In order to increase the field strength, the at least one angle detection transmitting coil 22 may be designed in multiple planes of the sensor circuit board.

The at least one angle detection receiving coil 20 is, as depicted in FIG. 2, likewise arranged between inner radius ri and outer radius ra. For example, the at least one angle detection receiving coil 20 is formed by at least two sub-coils 20*a*, 20*b*, which are flowed through by electrical current, in each case by a current flow in different directions (counter-clockwise or clockwise). The at least two sub-coils 20*a*, 20*b* may be designed in different planes of the circuit board.

Rotor element 14 preferably has at least one circular arc shaped electrically-conductive section 26. In the example from FIG. 2, three circular arc shaped electrically-conductive sections 26 are depicted. A circular ring (not depicted), in which the respective sector of electrically-conductive section 26 lies, has, with respect to axis of rotation A, an inner radius which is preferably somewhat smaller than inner radius ri. The circular ring, in which the respective sector of electrically-conductive section 26 lies, has, with respect to axis of rotation A, an outer radius, which is preferably somewhat larger than outer radius ra.

The opening angle (not depicted) of the sectors in which three electrically-conductive sections 26 lie, schematically depicted in FIG. 2, is preferably 60°. The angular distance between electrically-conductive sections 26 is preferably 60° in this case. The opening angle of a circular arc section is preferably M/2.

Compensation element 1 in the example has a first compensation receiving coil 30 and a second compensation receiving coil 31. These are arranged in the example with respect to each other and with respect to axis of rotation A in such a way that the alternating electromagnetic compensation field induces a first compensation AC voltage U1 in first compensation receiving coil 30 and a second compensation AC voltage U2 in second compensation receiving coil 31.

As is schematically depicted in FIG. 2, first compensation receiving coil 30 is arranged outside of second compensation receiving coil 31, when viewed in the radial direction, with respect to axis of rotation A. Compensation transmitting coil 28 is arranged outside of first compensation receiving coil 30, when viewed in the radial direction, with respect to axis of rotation A. The geometric shape of first compensation receiving coil 30 and of second compensation receiving coil 31 is preferably the same. First compensation receiving coil 30 and second compensation receiving coil 31 are preferably arranged on stator element 12 offset from each other by 90°. First compensation receiving coil 30 and second compensation receiving coil 31 are preferably arranged centered on stator element 12 with respect to axis of rotation A.

The dimensions of first compensation receiving coil 30 and of second compensation receiving coil 31 and of first electrically-conductive section 32 are dimensioned so that a winding of first compensation receiving coil 30 and a winding of second compensation receiving coil 31 are arranged, radially to axis of rotation A, at least partially overlapping with first electrically-conductive section 32.

The radial extension of first electrically-conductive section 32 is preferably less than the radial extension of first compensation receiving coil 30 and of second compensation receiving coil 31.

The dimensions of the at least one compensation transmitting coil 28 and of first electrically-conductive section 32 are dimensioned such that the at least one compensation transmitting coil 28 is arranged, radially to axis of rotation A, at least partially overlapping with first electrically-conductive section 32. The radial extension of first electrically-conductive section 32 is preferably less than the radial extension of the at least one compensation transmitting coil 28.

First compensation receiving coil 30 is formed by at least two sub-coils 30*a*, 30*b*, which are only provided with reference numerals in FIGS. 3 to 5 for reasons of clarity. Second compensation receiving coil 31 is preferably formed by at least two sub-coils 31*a*, 31*b*, which are likewise only provided with reference numerals in FIGS. 3 to 5 for reasons of clarity. The at least two sub-coils 30*a*, 30*b* are flowed through by electrical current, in each case by a current flow in different directions (counter clockwise or clockwise). The at least two sub-coils 31*a*, 31*b* are flowed through by electrical current, in each case by a current flow in different directions (counter clockwise or clockwise). The at least two sub-coils 30*a*, 30*b* or 31*a*, 31*b* may be designed in different planes of the circuit board.

FIG. 3 schematically shows the respective arrangement in rotation angle sensor 10 for each of the two compensation receiving coils 30, 31 in the Cartesian coordinate system from FIG. 2. In FIG. 3, the arrangement of the two compensation receiving coils 30, 31 is depicted in a predefined centered position of stator element 12 and rotor element 14 in rotation angle sensor 10. In this position, stator element 12 and rotor element 14 are centered with respect to axis of rotation A. This means that no tolerances occur in either the x-direction nor in the y-direction. In other words, stator element 12 and rotor element are located in a nominal position without deviation relative to each other.

Figure 6:
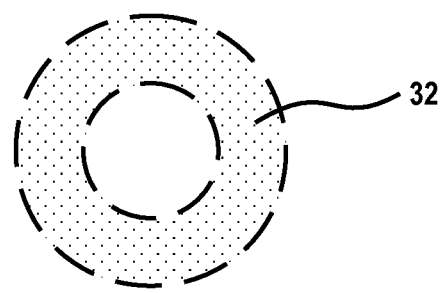

First electrically-conductive section 32 is designed as circular as depicted in FIG. 3. First electrically-conductive section 32 may also be designed as a circular ring (illustrated schematically and not to scale in FIG. 6). First electrically-conductive section 32 is preferably designed as an electrically-conductive circle or circular ring surrounding rotor element 14 in the circumferential direction. In principle, other shapes, which are point symmetrical with respect to axis of rotation A, are also possible.

First electrically-conductive section 32 is preferably designed in a plane perpendicular to axis of rotation A, symmetrical, in particular point symmetrical to axis of rotation A.

In the predefined, centered position of stator element 12 and of rotor element 14, first compensation receiving coil 30 and second compensation receiving coil 31 and first electrically-conductive section 32 are thus likewise located in a centered position with respect to axis of rotation A.

First compensation receiving coil 30 preferably has an identical number of first sub-coils 30*a* and second sub-coils 30*b*. These are arranged with respect to each other and with respect to axis of rotation A in such a way that the alternating electromagnetic compensation field induces a first AC voltage component in first sub-coil 30*a* and a second AC voltage component in second sub-coil 30*b* with reversed sign.

Second compensation receiving coil 31 preferably has an identical number of first sub-coils 31*a* and second sub-coils 31*b*. These are arranged with respect to each other and with respect to axis of rotation A in such a way that the alternating electromagnetic compensation field induces a first AC voltage component in first sub-coil 31a and a second AC voltage component in second sub-coil 31b with reversed sign.

Thus, the voltages induced in sub-coils 30a and 30b compensate and the first compensation AC voltage U1 is 0 V. Thus, the voltages induced in sub-coils 30a and 30b compensate and the second compensation AC voltage U2 is 0 V. Thus, the centered position may be easily detected.

First electrically-conductive section 32 extends radially from axis of rotation A. The at least one second electrically-conductive section 26 preferably connects radially to first electrically-conductive section 32. First electrically-conductive section 32 is arranged, when viewed in the radial direction, between axis of rotation A and second electrically-conductive section 26.

When viewed in the radial direction, a gap 34 or slot 34, preferably circular arc shaped, is provided between second electrically-conductive section 26 and first electrically-conductive section 32, said gap or slot preferably extending in the circumferential direction.

Gap 34 or slot 34 thereby separates first electrically-conductive section 32 and second electrically-conductive section 26. Slot 34 or gap 34 may have different geometric shapes and is preferably defined via the smallest radial spacing in which first electrically-conductive section 32 and second electrically-conductive section 26 are arranged on rotor element 14. Gap 34 or slot 34 is designed, for example, as a circular ring.

A radial extension D1 of first compensation receiving coil 30 or of second compensation receiving coil 31 is, as depicted in FIG. 3, larger than a radial extension D2 of first electrically-conductive section 32.

Extension D3 of gap 34 or of slot 34 in the radial direction is preferably at least 50% of the difference of radial extension D1 of first compensation receiving coil 30 and radial extension D2 of first electrically-conductive section 32.

Due to this spacing, inductive couplings of first conductive section 32 and angle detection receiving coil 20 or of second electrically-conductive section 26 and first compensation detection receiving coil 30 or second compensation receiving coil 31 are prevented at radial displacements. Basically, a point symmetrical arrangement or configuration of first conductive section 32 and second electrically-conductive section 26 is sufficient.

First compensation AC voltage U1 and second compensation AC voltage U2 differ at a radial displacement of first electrically-conductive section 32 with respect to a predefined radial arrangement of first electrically-conductive section 32 with respect to axis of rotation A. This is subsequently described in the Cartesian coordinate system from FIG. 2 by way of FIG. 4 and FIG. 5.

FIG. 4 schematically shows two detail views of rotation angle sensor 10 in an arrangement of stator element 12 and rotor element 14 in rotation angle sensor 10, in which a radial displacement occurs only in the x-direction. In other words, the mirror symmetry of first conductive section 32 to the x-axis remains maintained. For this purpose, first conductive section 32 is no longer mirror-symmetrical to the y-axis.

Thus, in first compensation receiving coil 30, a voltage of the same amount with different sign is induced in the at least two sub-coils 30a and 30b. Thus, the voltages induced in the at least two sub-coils 30a and 30b compensate, and first compensation AC voltage U1 is 0 V.

In contrast, in second compensation receiving coil 31, a voltage of different amount with different sign is induced in the at least two sub-coils 31a and 31b. Thus, the voltages induced in the at least two sub-coils 31a and 31b do not compensate, and second compensation AC voltage U2 is not equal to 0 V.

FIG. 5 schematically shows two detail views of rotation angle sensor 10 in an arrangement of stator element 12 and rotor element 14 in rotation angle sensor 10, in which a radial displacement occurs only in the y-direction. In other words, the mirror symmetry of first conductive section 32 to the y-axis remains maintained. Therefor, first conductive section 32 is no longer mirror-symmetrical to the x-axis.

Thus, in first compensation receiving coil 30, a voltage of different amount with different sign is induced in the at least two sub-coils 30a and 30b. Thus, the voltages induced in the at least two sub-coils 30a and 30b do not compensate, and first compensation AC voltage U1 is not equal to 0 V.

In contrast, in second compensation receiving coil 31, a voltage of the same amount with different sign is induced in at least two sub-coils 31a and 31b. Thus, the voltages induced in the at least two sub-coils 31a and 31b compensate, and second compensation AC voltage U2 is equal to 0 V.

First compensation receiving coil 30 and second compensation receiving coil 31 are generally arranged so that in the case of a (radial) displacement of first conductive section 32, first compensation AC voltage U1 and second compensation AC voltage U2 change in comparison to the values of first compensation AC voltage U1 and second compensation AC voltage U2, expected when first conductive section 32 is located in the predefined radial position or in the nominal position. First compensation AC voltage U1 and second compensation AC voltage U2 are preferably each 0 V (zero volts) in the predefined radial position or in the nominal position.

The invention claimed is:

1. A rotation angle sensor, comprising:
a stator element;
a rotor element rotatably mounted about an axis of rotation with respect to the stator element, the rotation angle sensor configured to detect a rotation angle by an inductive coupling between the rotor element and the stator element;
a compensation element arranged on the stator element, the compensation element comprising a compensation transmitting coil configured to emit an alternating electromagnetic compensation field, and at least one compensation receiving coil configured to receive the alternating electromagnetic compensation field,
wherein the rotor element has a first electrically-conductive section,
wherein the first electrically-conductive section is arranged on the rotor element in such a way and is inductively coupled to the compensation transmitting coil and to the at least one compensation receiving coil of the compensation element in such a way that, during the emission of the alternating electromagnetic compensation field by the compensation transmitting coil, a compensation AC voltage, induced in the at least one compensation receiving coil, is dependent on a relative radial arrangement of the stator element and of the rotor element to each other with respect to the axis of rotation,
wherein the stator element has at least one angle detection transmitting coil configured to emit an alternating electromagnetic angle detection field, and at least one angle detection receiving coil configured to detect the alternating electromagnetic angle detection field, wherein the rotor element has at least one second electrically-conductive section,
wherein the at least one second electrically-conductive section is inductively coupled to the at least one angle detection receiving coil in such a way that, during emission of the alternating electromagnetic angle detection field by the at least one angle detection transmitting coil, at least one angle detection AC voltage is induced in the at least one angle detection receiving coil,
wherein the at least one second electrically-conductive section is arranged on the rotor element in such a way that the at least one angle detection AC voltage, induced in the at least one angle detection receiving coil, is dependent on a rotation angle between the stator element and the rotor element,
wherein the at least one second electrically-conductive section is arranged on the rotor element outside of the first electrically-conductive section, in a radial direction with respect to the axis of rotation, and
wherein the at least one angle detection transmitting coil is arranged on the stator element outside of the compensation element, in the radial direction with respect to the axis of rotation.

2. The rotation angle sensor as claimed in claim 1, wherein:
the compensation element has a first compensation receiving coil and a second compensation receiving coil, which are arranged in such a way with respect to each other and with respect to the axis of rotation that the alternating electromagnetic compensation field induces a first compensation AC voltage in the first compensation receiving coil and a second compensation AC voltage in the second compensation receiving coil, and
the first compensation AC voltage and the second compensation AC voltage change in a case of a radial displacement of the first electrically-conductive section with respect to a predefined radial arrangement of the first electrically-conductive section with respect to the axis of rotation in comparison to values of the first compensation AC voltage and the second compensation AC voltage, expected when the first conductive section is located in the predefined radial arrangement.

3. The rotation angle sensor as claimed in claim 1, wherein:
a winding of the at least one compensation receiving coil is arranged at least partially overlapping with the first electrically-conductive section radially to the axis of rotation, and
a radial extension of the first electrically-conductive section is smaller than a radial extension of the at least one compensation receiving coil.

4. The rotation angle sensor as claimed in claim 1, wherein:
a winding of the at least one compensation transmitting coil is arranged at least partially overlapping with the first electrically-conductive section radially to the axis of rotation, and
a radial extension of the first electrically-conductive section is smaller than a radial extension of the at least one compensation transmitting coil.

5. The rotation angle sensor as claimed in claim 1, wherein the at least one first electrically-conductive section is an electrically-conductive circle or circular ring surrounding the axis of rotation of the rotor element in a circumferential direction.

6. The rotation angle sensor as claimed in claim 1, wherein:
the at least one first electrically-conductive section extends radially from the axis of rotation,
the first electrically-conductive section is arranged between the axis of rotation and the second electrically-conductive section, in the radial direction, and
a circular arc shaped gap or slot is located between the second electrically-conductive section and the first electrically-conductive section, in the radial direction.

7. The rotation angle sensor as claimed in claim 6, wherein a radial extension of the at least one compensation receiving coil is larger than a radial extension of the first conductive section.

8. The rotation angle sensor as claimed in claim 7, wherein an extension of the gap or slot in the radial direction is at least 50% of a difference of the radial extension of the at least one compensation receiving coil and the radial extension of the first conductive section.

9. The rotation angle sensor as claimed in claim 1, wherein:
the at least one compensation receiving coil comprises an identical number of first sub-coils and second sub-coils, which are arranged with respect to each other and with respect to the axis of rotation in such a way that the alternating electromagnetic compensation field induces a first AC voltage component in the first sub-coil and a second AC voltage component in the second sub-coil with reversed sign, and
the first AC voltage component and the second AC voltage component compensate in a predefined radial arrangement of the first electrically-conductive section with respect to the axis of rotation.

10. The rotation angle sensor as claimed in claim 1, wherein the first electrically-conductive section is symmetrical with respect to the axis of rotation when the first electrically-conductive section is located in a predefined radial arrangement to the axis of rotation.

* * * * *